3,338,748
METHOD FOR REMOVING PARTICLES OF UNDESIRABLE MATERIAL FROM AN AMALGAM SYSTEM
Lawrence J. Uline, Lakewood, Ohio, assignor to Union Carbide Corporation, a corporation of New York
No Drawing. Filed Dec. 23, 1963, Ser. No. 332,935
3 Claims. (Cl. 136—86)

The invention concerns a method for removing an undesirable material from a system containing an amalgam, and particularly refers to such a method with respect to an amalgam circulation system for a fuel cell employing as the fuel an amalgam containing an anodic material, e.g., sodium and/or potassium.

An anodic material amalgam-oxidant fuel cell battery comprises an anode, a cathode,, an electrolyte between the two, and any necessary auxiliary equipment required for continuous operation. For such operation, the oxidant, e.g., oxygen gas, must be continuously supplied to the cathode, the electrolyte must be circulated to cool it and to permit adjustment of the concentration of electrolyte material, and the anodic material amalgam must be continuously supplied to the anode. In addition, since the mercury component of the amalgam does not enter into the cell reaction, this component must be removed from the cell to prevent an undesirable accumulation of this conductive material. In most instances, the partially depleted amalgam will be regenerated with more sodium and then recirculated to the anode as an anodic fuel.

One of the problems attendant with an anodic material amalgam-oxidant battery is that solid particles of materials accumulate in the amalgam circulation system and thus block the amalgam flow. These particles result from the entrainment of droplets of electrolyte, which is usually an unsaturated aqueous solution of sodium hydroxide, potassium hydroxide, sodium chloride, potassium chloride, or mixtures thereof, in the depleted sodium amalgam removed from the cell. As these droplets circulate through the amalgam system, sodium hydroxide and/or potassium hydroxide, and hydrates thereof, are frequently formed by reaction of the water in the droplets with the anodic material in the depleted or enriched amalgam. The hydroxides and hydrates thereof thus produced along with the electrolyte material will form solid particles if a saturated or hydration concentration in the droplets is reached. The solid materials, if not removed, will accumulate and block the amalgam flow. Moreover, electrolyte solutions oftentimes contain other materials such as the salts in sea water which aggravate the problem.

The principal object of the invention is, therefore, to provide a method for removing particles of undesirable material from a system containing an amalgam. Another object is to provide an improvement in the method of supplying anodic material amalgam as an anodic fuel to a fuel cell.

Broadly, the above objects are achieved by a method which comprises injecting into a system containing an amalgam a liquid immiscible with the amalgam and solvent to particles of undesirable materials in the system, permitting the liquid including the dissolved material to separate from the amalgam, and then removing the liquid from the system. Since the undesirable materials usually include sodium hydroxide, salts, or other electrolyte materials, water or unsaturated aqueous solutions, such as the cell electrolyte, will suffice as the liquid in most cases.

The liquid is preferably introduced into the amalgam system in such a manner that it will not be trapped in an inaccessible area by the heavy amalgam. This can be accomplished by introducing the liquid into a part of the system which rises in the direction of amalgam flow.

At another place in the system, the liquid, including any dissolved material, is separated from the amalgam to form a separate mass, and the liquid is then removed from the system. Since the liquid must be immiscible with the amalgam, and since it will usually be lighter in density, this phase of the operation can be easily accomplished by a vessel which will permit the liquid to rise to the top to form a separate mass. A tap into this separate mass will permit removal of the liquid from the system. A valve having a float mechanism which will open to permit discharge of the liquid and close when the heavier amalgam fills the float chamber may be used in conjunction with the tap for automatic removal of the liquid from the system.

A sodium amalgam circulation system has been kept sufficiently free of particles in accordance with the method of the invention to ensure uninterrupted flow of the amalgam. Before the invention, the circulation system became clogged with precipitated particles. It was found that best results could be obtained if the liquid was introduced and removed at several places in the system, especially across the sections, such as joints and sharp bends, which normally accumulate the precipitated particles.

It was also found that an unsaturated, but substantially concentrated aqueous solution of electrolyte material such as a 5 normal solution of sodium hydroxide, was preferred as the liquid, since such a solution is more inert to the sodium amalgam than water alone. Loss of sodium by reaction and the formation of additional precipitated particles is thereby minimized. In addition, battery electrolyte is usually readily available from the electrolyte circulation system.

Although the description herein has been directed towards potassium and sodium amalgams, it will be understood that the invention applies equally as well to liquid amalgams of other alkali or alkaline earth metals, zinc, cadmium, tin, and lead, and also to the corresponding electrolytes in a fuel cell employing such amalgams as an anodic fuel. Cathodic materials which may be advantageously employed include oxygen, chlorine, and bromine.

What is claimed is:
1. In a method for supplying an anodic material amalgam as an anodic fuel from a circulation system to an anodic material amalgam-oxidant fuel cell comprising an anode, a cathode, and an aqueous solution of an electrolyte material in electrochemical relationship therewith, which method comprises supplying said amalgam to said anode, removing depleted amalgam from said cell, regenerating said depleted amalgam with more anodic material to form regenerated amalgam, and recirculating said regenerated amalgam to said anode; the improvement which comprises injecting into said circulation system a liquid immiscible with said amalgam and solvent to said electrolyte material, hydroxides of said anodic material, and hydrates thereof, thereby dissolving any particles of said electrolyte material, said hydroxides, and said hydrates formed in said system, permitting said liquid including any dissolved materials to form a separate mass, and then removing said liquid from said system.

2. The improvement defined in claim 1 wherein said anodic material is sodium, said electrolyte material is sodium hydroxide, and said liquid is selected from the group consisting of water and unsaturated aqueous solutions of sodium hydroxide.

3. The improvement defined in claim 1 wherein said anodic material is potassium, said electrolyte material is potassium hydroxide, and said liquid is selected from the group consisting of water and unsaturated aqueous solutions of potassium hydroxide.

References Cited

UNITED STATES PATENTS

| 3,104,949 | 9/1963 | Glover | 75—81 |
| 3,113,018 | 12/1963 | Young | 75—101 |
| 3,161,546 | 12/1964 | Yeager et al. | 136—86 |

WINSTON A. DOUGLAS, *Primary Examiner.*

H. FEELEY, *Assistant Examiner.*